Dec. 8, 1953 P. M. FIELD 2,661,655
COPY RETENTION AND HOUSING VENTILATING
MEANS FOR OPAQUE PROJECTOR APPARATUS
Filed Oct. 17, 1950 3 Sheets-Sheet 3
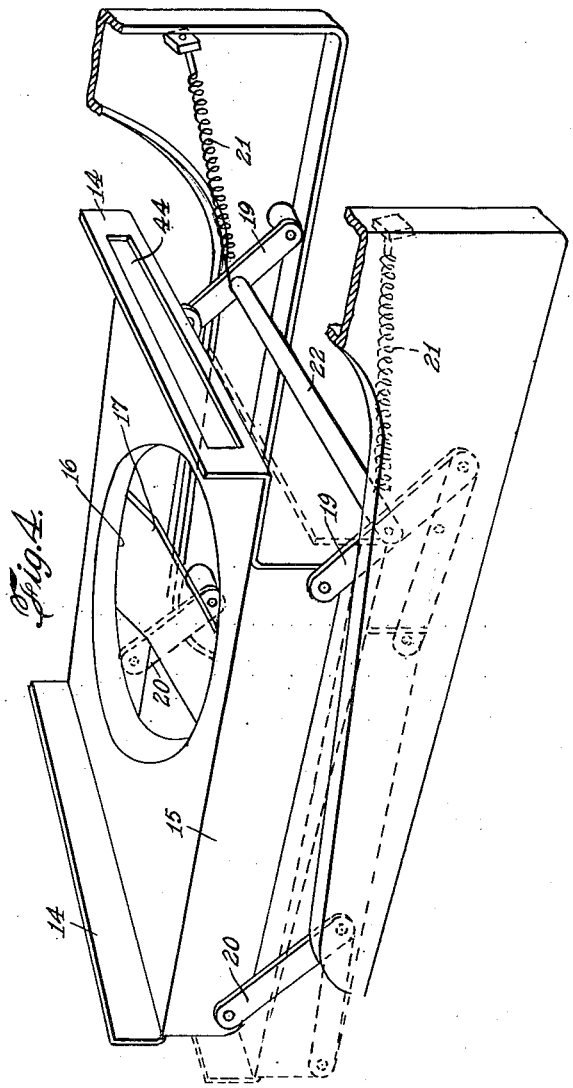
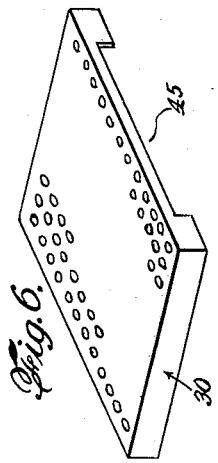
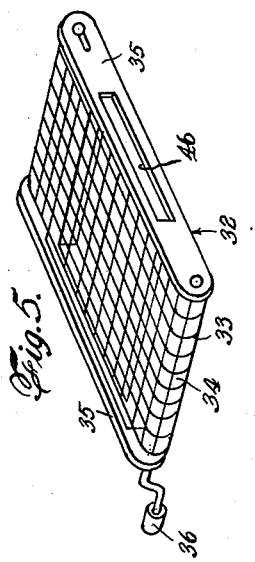
INVENTOR.
PHILIP M. FIELD
BY
ATTORNEY.

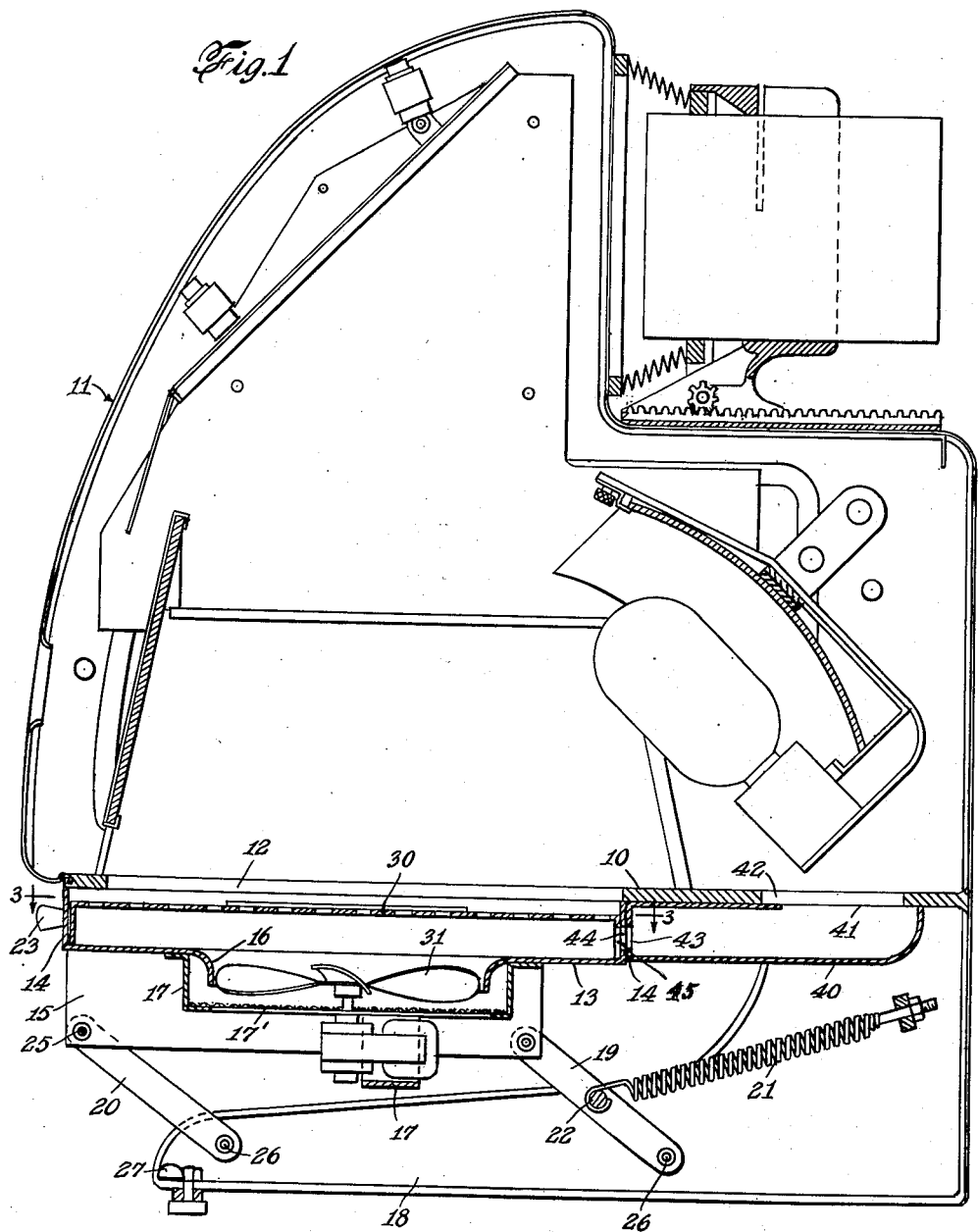

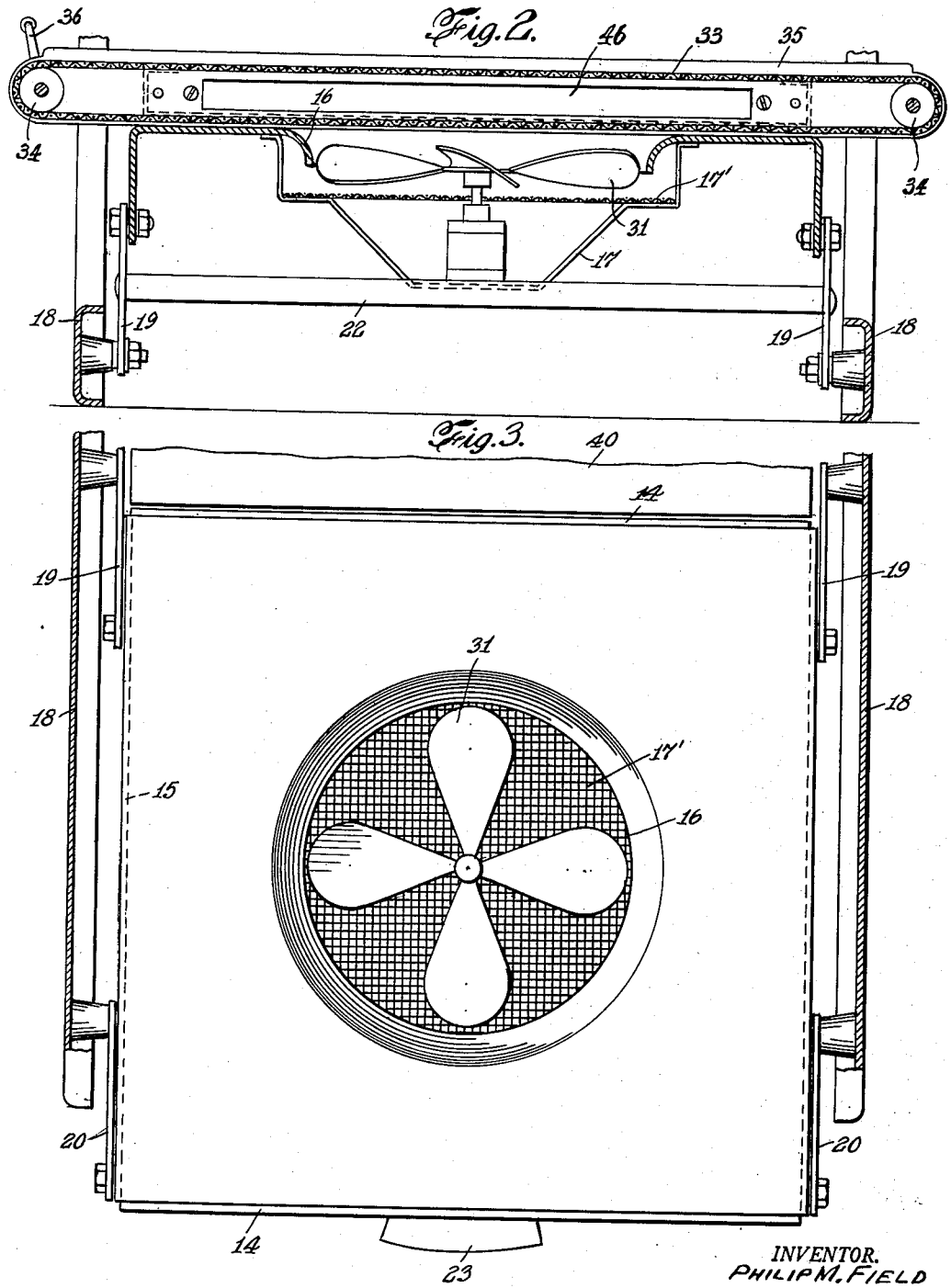

Patented Dec. 8, 1953

2,661,655

UNITED STATES PATENT OFFICE 2,661,655

COPY RETENTION AND HOUSING VENTILATING MEANS FOR OPAQUE PROJECTOR APPPARATUS

Philip M. Field, New York, N. Y., assignor to Charles Beseler Company, Newark, N. J., a partnership Application October 17, 1950, Serial No. 190,584

4 Claims. (Cl. 88—26)

1

The invention relates to projector apparatus designed more especially for the projection upon a suitable screen of opaque copy such as photographs, post cards, pages of a book or magazine, as well as three-dimensional objects.

It has for an object to facilitate opaque projection, more particularly in the provision of a platen or the like for receiving material to be projected whereby the latter is held firmly in position thereon during projection.

A further object of the invention is to provide a copy-receiving element of a foraminous nature and preferably as an endless belt having means accessible externally of the projector housing for advancing the same manually to bring copy successively into projection position.

Another object of the invention is to so construct the copy-receiving element that it may be introduced from one side and removed from the opposite side of a suitable and vertically adjustable support or platen member.

Still another object of the invention is to provide pneumatic means for retaining copy on its foraminous receiving element which will at the same time afford suitable ventilation of the interior of the projector housing.

The invention has for an object, also, to provide means for by-passing to a predetermined degree the foraminous surface of the copy-receiving element for ventilation purposes and particularly under conditions when the said surface is substantially covered by copy to be projected.

In carrying out the invention, opaque copy to be projected is placed on a suitable foraminous supporting element with which is associated means to induce a flow of air through the support and thereby maintain the copy thereon firmly against its foraminous surface. The support assembly as a whole may be arranged to be depressed manually below the projection plane for insertion and removal of the copy. Provision is made to by-pass, in a predetermined proportion, flow of air below the copy, particularly in case the latter should be present to an extent to impede substantially the flow through the foraminous surface. Simultaneous copy retention for projection and for the ventilation of the interior of the projector apparatus is thereby assured.

The nature of the invention, however, will best be understood when described in connection with the accompanying drawings, in which:

Fig. 1 is a longitudinal section through an opaque copy projector apparatus equipped with the novel copy retention and projector ventilating means.

2

Fig. 2 is a fragmentary transverse vertical section thereof with a form of copy-receiving element, different from that shown in Fig. 1, located on the copy-support assembly.

Fig. 3 is a fragmentary horizontal section with copy-receiving element removed, taken on the line 3—3, Fig. 1.

Fig. 4 is a view in isometric projection illustrating a platen member and movable support therefor.

Fig. 5 is a view in isometric projection of one form of a foraminous copy-receiving element to be supported on the platen member; and Fig. 6 is a similar view illustrating a modification of the same.

Referring to the drawings, 10 designates a horizontal frame or plate portion of a projector apparatus indicated by its housing 11 and of the general nature of that set forth in my prior U. S. Letters Patent No. 2,463,026. The frame portion 10 is provided with an aperture 12 designed to accommodate a support member in presenting the copy for projection. This member is of novel construction and mounting. It comprises a substantially rectangular plate or platen 13 which is provided with integral upturned ends 14 and downwardly turned sides 15. At its central portion, plate 13 is depressed to provide an opening 16 and carries as well a supporting bracket 17 with air discharge screen 17' beyond the opening. The plate 13 is pivotally connected to the bottom frame portion 18 as through a forward pair of arms 19 and rearward pair 20 normally parallel thereto, the opposite free ends of which pairs of arms are pivoted respectively to forward portions of the sides 15 and the rearward portions thereof. A pair of springs 21 attached to the forward arms, or rather to a cross rod 22 connecting the same, tend to draw the plate upwardly toward the aperture 12 into projection location. An operating knob or handle 23 is secured to the rearward one of the upturned ends 14 for use in depressing the support member, as for loading opaque copy thereon. In so doing, the member is to be depressed to an extent sufficient to carry the upper pivot points 25 of the rearward pair of arms below the plane of the lower pivot points 26 of both pairs of arms, as is indicated in the broken-line position (Fig. 4).

The rear pair of arms will then be caused to engage bumpers 27 on the bottom frame portion 18 while the forward pair of arms will be drawn upwardly under the action of springs 21. Movement in this direction, however, is limited since the springs lock automatically the rearward arms 20 against the bumpers so that the forward pair of arms 19 may not continue their upward movement beyond a predetermined distance as fixed by the bumper positions.

When the rearward arms are then again released by manually elevating this end beyond the critical pivot points 26, the copy-supporting member will continue upwardly under the action of springs 21 toward the aperture 12 to locate copy in the proper plane for projection, all of which is more particularly set forth in my co-pending application Serial No. 190,582, filed of even date herewith and which eventuated in Patent No. 2,624,235 dated January 6, 1953. In accordance with the invention, the copy is to be retained on the platen 13 by constituting said platen as a suction platen in making its support surface foraminous. This may be effected by placing over the opening 16, in inverted position, a tray-like screen 30, Figs. 1 and 6, or similar member.

To provide the required suction, a motor-driven fan 31 is supported below plate 13 on the bracket 17 and immediately under the opening 16. This tray-like screen (Fig. 6) may be introduced from one side of the projector into the space provided between the upturned ends 14, Fig. 1; or a copy-receiving and advancing element 32, Fig. 5, may be substituted therefor and similarly introduced, Fig. 2. This latter element comprises an endless foraminous belt 33 mounted over end rolls 34 secured in the ends of a frame 35. An operating handle 36 is attached to one of the rolls and is designed to extend externally of the housing, when the foraminous element is installed in the platen, for manual operation to advance copy on the belt 33 into the projection field of the apparatus, the copy being retained firmly on the foraminous surface of the element under the suction provided by fan 31.

The hereinbefore described means for retaining copy upon the platen through the action of the suction provided by fan 31 allows also of ventilating effectively the interior of the housing above said platen by withdrawing heated air, unless the copy should cover substantially the foraminous supporting surface. It is therefore expedient to provide by-passing means for a flow of air below the said supporting surface. This is readily effected by means of a duct member 40 closed at one end but having a top opening 41 juxtaposed to an additional opening 42 in the frame plate 10, the other end of said duct being open as at 43 and juxtaposed to an opening 44 in one of the upturned ends 14.

It will be understood that the frame plate 10 divides the projector housing transversely into two sections which are sealed more or less effectively against air flow except as to the two aforesaid openings 12 and 41. The former opening is of substantially greater area than the latter so as to insure a substantial holding effect on copy located on a copy-receiving element. The proportional areas are determined by the conditions for which the projector is designed. It will be noted, also, that the suction effect will be enhanced with respect to the opening 12 by positioning the fan 31 immediately below said opening for direct suction, while the path from the fan to the opening 41 is somewhat tortuous and thus favors constant suction through the opening 12. Also, the area of the foraminous surface of a copy-receiving element is designed to be somewhat greater than the largest copy-holding area required in the projector apparatus. This will insure under all conditions at least ventilation about the copy.

With the types of copy-receiving elements such as the tray 30 or endless belt member 32 it will be necessary to provide therein a lateral opening 45 in the case of the former and a similar opening 46 in the case of the latter. The respective openings are then to be juxtaposed to the platen opening 44 and duct opening 43 as is indicated for the tray type in Fig. 1 of the drawings. The proportionate by-pass volume will be determined by the volume of the housing interior and the capacity of the fan.

I claim:

1. In apparatus for projecting from opaque copy an image thereof upon a screen and including a housing for a lamp to illuminate the copy; a horizontal plate portion of the housing provided with an aperture; a platen member provided with an opening coaxial with the aperture for passage of air, said platen member comprising a flat element having upturned ends and downturned sides, one of the upturned ends being provided with an opening through which air above the platen member may be drawn from the interior of the housing; a foraminous copy-receiving element supported by said platen member, the latter being movably supported by the housing below the plate portion for juxtapositioning to the plane of the aperture; and air suction means located beneath the platen member to induce a flow of air through the housing to ventilate the housing interior above the plate portion and to establish through the aperture thereof a differential pressure to retain copy on said copy-receiving element in the projection plane when juxtaposed to the aperture.

2. Projection apparatus of the nature set forth in claim 1, wherein the platen member comprises a flat element having upturned ends and downturned sides and one of the upturned ends is provided with an opening through which air above the platen member may be drawn from the interior of the housing, and a duct at its one end is juxtaposed to the said opening of the upturned end of the platen member and at its opposite end is closed and provided with an opening directed to the interior of the projector housing above the platen member.

3. Projection apparatus of the nature set forth in claim 1, wherein the platen member comprises a flat element having upturned ends and downturned sides and one of the upturned ends is provided with an opening through which air above the platen member may be drawn from the interior of the housing, and a duct at its one end is juxtaposed to the said opening of the upturned end of the platen member and at its opposite end is closed and provided with an opening directed to the interior of the projector housing above the platen member, and the foraminous copy-receiving element is a tray with perforated bottom and an opening in one of its end walls for juxtaposition to the opening in the said one upturned end, said tray being supportable on the platen in an inverted position.

4. Projection apparatus of the nature set forth in claim 1, wherein the platen member comprises a flat element having upturned ends and downturned sides and one of the upturned ends is provided with an opening through which air above the platen member may be drawn from the interior of the housing, and a duct at its one end is juxtaposed to the said opening of the upturned end of the platen member and at its opposite end is closed and provided with an opening directed to the interior of the projector housing above the platen member, and the foraminous copy-receiving element is provided as an endless belt unit fitting between the upturned ends of the flat element for reception of copy upon the belt surface at one of the sides of said flat element, and means are provided externally of the housing for advancing said belt.

PHILIP M. FIELD.

References Cited in the file of this patent

UNITED STATES PATENTS

| Number | Name | Date |
|---|---|---|
| 1,082,678 | Casler | Dec. 30, 1913 |
| 1,341,665 | Ott et al. | June 1, 1920 |
| 1,770,659 | Oemichen | July 15, 1930 |
| 1,813,689 | Weisker | July 7, 1931 |
| 1,831,762 | Blohm | Nov. 10, 1931 |
| 1,831,766 | Hanks | Nov. 10, 1931 |
| 1,848,378 | Ott | Mar. 8, 1932 |
| 2,463,026 | Field | Mar. 1, 1949 |
| 2,624,235 | Field | Jan. 6, 1953 |

FOREIGN PATENTS

| Number | Country | Date |
|---|---|---|
| 161,480 | Germany | July 8, 1905 |
| 269,090 | Germany | Jan. 10, 1914 |
| 453,142 | Germany | Nov. 29, 1927 |

OTHER REFERENCES

Spencer Lens Co. Leaflet entitled "Directions for Operation and Care of Spencer Delineascopes" 1 sheet printed on both sides and identified as DIR. 13-11 240, printed in Feb. 1940.